United States Patent
Urairi et al.

(10) Patent No.: US 6,896,994 B2
(45) Date of Patent: May 24, 2005

(54) BATTERY SEPARATOR CONTAINING CARBODIIMIDE POLYMER

(75) Inventors: Masakatsu Urairi, Osaka (JP); Keisuke Kii, Osaka (JP); Yutaka Kishii, Osaka (JP); Yutaka Yamamura, Osaka (JP); Masao Abe, Osaka (JP); Sadahito Misumi, Osaka (JP)

(73) Assignee: Nitto Denko Corporation, Osaka (JP)

(*) Notice: Subject to any disclaimer, the term of this patent is extended or adjusted under 35 U.S.C. 154(b) by 13 days.

(21) Appl. No.: 09/980,496

(22) PCT Filed: Apr. 4, 2001

(86) PCT No.: PCT/JP01/02918

§ 371 (c)(1),
(2), (4) Date: Dec. 4, 2001

(87) PCT Pub. No.: WO01/75992

PCT Pub. Date: Oct. 11, 2001

(65) Prior Publication Data
US 2002/0172870 A1 Nov. 21, 2002

(30) Foreign Application Priority Data

| Apr. 5, 2000 | (JP) | 2000-103446 |
|---|---|---|
| Apr. 5, 2000 | (JP) | 2000-103450 |
| May 4, 2000 | (JP) | 2000-103451 |
| Oct. 26, 2000 | (JP) | 2000-327159 |
| Nov. 17, 2000 | (JP) | 2000-350559 |

(51) Int. Cl.$^7$ .............................. H01M 2/18
(52) U.S. Cl. ..................... 429/144; 429/129; 429/134
(58) Field of Search ................. 429/129, 134, 429/144

(56) References Cited

U.S. PATENT DOCUMENTS 5,093,214 A    3/1992   Saito et al. ............... 429/44
5,389,471 A *  2/1995   Kung ....................... 429/206
5,416,149 A *  5/1995   Amano et al. ............. 524/423

FOREIGN PATENT DOCUMENTS

| EP | 0805172 A2 * | 5/1997 | .......... C08G/18/79 |
|---|---|---|---|
| EP | 0 805 172 A2 | 11/1997 | |
| EP | 0 935 303 A1 | 8/1999 | |
| EP | 0 937 811 A2 | 8/1999 | |
| EP | 1 059 348 A1 | 12/2000 | |
| EP | 1059348 A1 * | 12/2000 | .......... C09K/19/38 |
| JP | 2-98004 | 4/1990 | .......... H01B/1/12 |
| JP | 4-167355 | 6/1992 | .......... H01M/2/16 |
| JP | 6-16907 | 1/1994 | .......... C08L/63/00 |
| JP | 10-294129 | 11/1998 | .......... H01M/10/40 |
| JP | 11-238496 | 8/1999 | .......... H01M/2/16 |
| JP | 2000-223106 | * 8/2000 | .......... H01M/2/16 |

OTHER PUBLICATIONS

International Search Report.
Wiff, D.R., et al., "Polycarbodiimide and polyimide/cyanate thermoset in situ molecular composites", J. Mater. Res., vol. 13, No. 7, Jul. 1998.
Patent Abstracts of Japan—2000223106 (Aug. 11, 2000).
European Search Report dated Nov. 27, 2002.

* cited by examiner

Primary Examiner—Dah-Wei Yuan
(74) Attorney, Agent, or Firm—Sughrue Mion, PLLC

(57) ABSTRACT

A separator capable of inhibiting the self-discharge of a battery.

The separator is a battery separator obtained by applying a polymer having in the molecule a carbodiimide unit represented by the following formula (I):

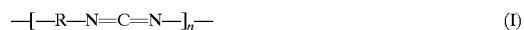

(wherein R means an organic group and n means an integer of 1 to 10,000) to a porous sheet substrate.

2 Claims, 1 Drawing Sheet

BATTERY SEPARATOR CONTAINING CARBODIIMIDE POLYMER

TECHNICAL FIELD

The present invention relates to a battery separator comprising a porous sheet substrate to which polycarbodiimide has been applied. The separator of the invention highly effectively functions to inhibit a battery from suffering self-discharge.

BACKGROUND ART

Secondary batteries such as nickel-hydrogen cells and nickel-cadmium (Ni—Cd) cells are recently expected to be used as power sources for electric cars as well as small batteries for electrical/electronic appliances. Such a secondary battery is generally constituted of a positive electrode, a negative electrode, and a separator. Among these, the separator serves to prevent the cell from short-circuiting between the electrodes and enable ions to pass therethrough, and is required to have hydrophilicity, chemical resistance, and mechanical strength. A hydrophilic nonwoven fabric formed from a polyamide resin or the like has conventionally been known as a separator. However, this separator has insufficient resistance to chemicals (alkalis and acids). Because of this, separators comprising polyolefin nonwoven fabrics which have undergone various treatments are also known. Specifically, separators obtained by subjecting a polyolefin-based nonwoven fabric to a hydrophilizing treatment, e.g., impregnation with a surfactant, plasma treatment, grafting treatment, sulfonation treatment, or the like, have been proposed (Unexamined Published Japanese Patent Applications Nos. 4-167355 and 11-238496, etc.).

Furthermore, since the polyamide-based nonwoven fabric has amide bonds, batteries employing this as a separator show a higher degree of self-discharge than batteries employing an electrochemically inert polyolefin nonwoven fabric and have poor battery properties. In contrast, batteries employing a separator obtained by subjecting a polyolefin-based nonwoven fabric to a specific treatment cannot be regarded as fully satisfactory in self-discharge characteristics, although superior in overall battery properties to batteries employing the polyamide-based separator.

Specifically, the separator obtained by treating a polyolefin-based nonwoven fabric with a surfactant shows effective hydrophilicity in the initial state of use. However, when this separator is once immersed in water, taken out therefrom, dried, and reimmersed in water, the hydrophilicity decreases considerably. In addition, this separator is unsatisfactory in self-discharge characteristics.

Furthermore, the polyolefin-based nonwoven fabric which has undergone a plasma treatment has hydrophilic groups bonded to the substrate surface by covalent bonding and hence retains sufficient wettability even when it is immersed in water, dried once, and reimmersed in water. Namely, it is wet-dry reversible. However, in the case where this nonwoven fabric is immersed in an aqueous alkali solution having a high concentration, it is not wetted by water when it is washed with water, dried, and reimmersed in water. It is presumed that the hydrophilic but weakly adherent, interfacial layer formed on the substrate surface by the plasma treatment was peeled off upon contact with the high concentration aqueous alkali solution. This separator also is ineffective in greatly improving the inhibition of self-discharge.

In the case of the polyolefin-based nonwoven fabric which has undergone a grafting treatment, a water-soluble monomer is tenaciously bonded to a substrate by covalent bonding. However, the polyolefin treated by grafting with acrylic acid or methacrylic acid has the possibility of undergoing oxidative decomposition in a strongly oxidizing atmosphere because this polyolefin is of the carboxylic acid type. Consequently, this nonwoven fabric is used as a battery separator in limited applications.

Furthermore, the polyolefin-based nonwoven fabric which has undergone a sulfonation treatment has sulfonic groups tenaciously bonded to the substrate by covalent bonding. Consequently, this nonwoven fabric retains long-lasting hydrophilicity and functions to inhibit a battery from suffering self-discharge. However, the treatment necessitates a post-washing step.

An object of the invention is to provide a separator which eliminates the drawbacks of the conventional battery separators described above and is capable of inhibiting a battery from suffering self-discharge. The present inventors made extensive investigations on the self-discharge of batteries. As a result, it has unexpectedly been found that the self-discharge of a battery is considerably inhibited by using a separator having polycarbodiimide present thereon. The invention has thus been completed.

DISCLOSURE OF THE INVENTION

The invention provides a battery separator obtained by applying a polymer having in the molecule a carbodiimide unit represented by the following formula (I):

—[—R—N=C=N—]$_n$—  (I)

(wherein R means an organic group and n means an integer of 1 to 10,000) to a porous sheet substrate. The sheet substrate is preferably a porous nonwoven fabric, in particular a nonwoven fabric comprising a polyolefin, or a porous sheet formed by sintering a powder of ultrahigh molecular polyethylene. These substrates may be one in which at least part of the surface thereof is coated with the polycarbodiimide of formula (I), or may be one which holds particles or a powder of the polymer of formula (I) in pores thereof. Furthermore, a porous sheet produced by aggregating coated polymer particles obtained by forming a coating layer of polycarbodiimide on the surface of core particles may be used as the separator.

DETAILED DESCRIPTION OF THE INVENTION

Figure 1:
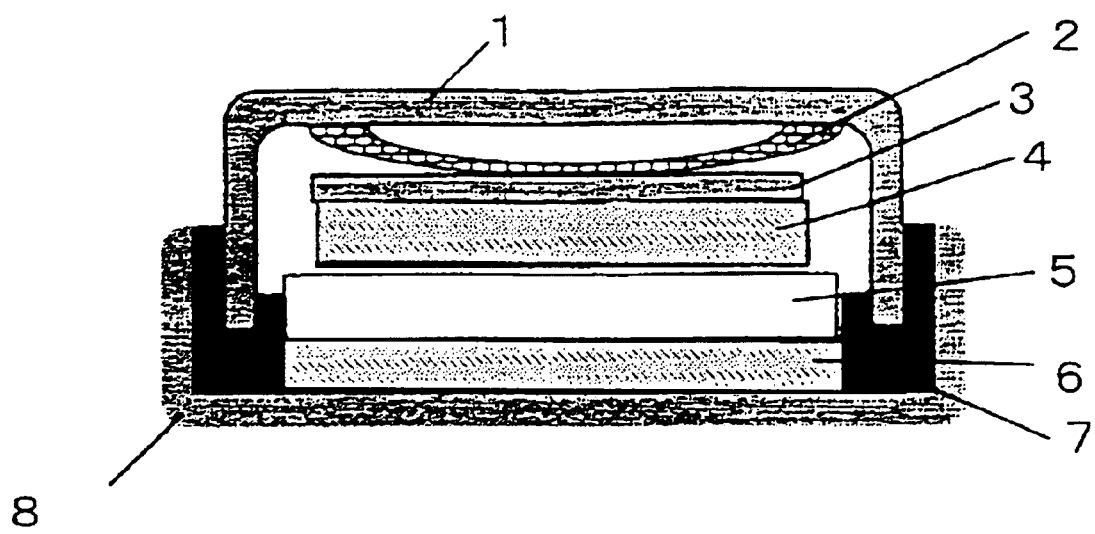
[FIG. 1] A schematic sectional view illustrating one embodiment of a button cell employing the separator of the invention.

A battery employing the separator of the invention may have the same structure as conventional batteries, and has a positive electrode, a negative electrode, and the separator interposed between the two electrodes. The other materials constituting the battery, including the electrolytic solution and battery case, may be the same as in conventional batteries. FIG. 1 is a schematic sectional view of a coin cell employing the separator of the invention. As shown in FIG. 1, a nickel wire gauze 2 and a nickel collector 3 are disposed in a cell inner case 1. Furthermore, a negative electrode 4, a separator 5, and a positive electrode 6 are superposed thereon and an outer cover 8 is attached through a packing 7. The battery according to the invention may be either a cylindrical cell containing electrodes and a separator which have been superposed and spirally wound or a prismatic cell comprising electrodes and a separator which have been superposed and packed in a case.

The porous sheet serving as the substrate is not particularly limited in material. However, for use in applications where the separator is used in a strongly oxidizing or reducing atmosphere, e.g., like the separators for alkali secondary batteries, the material of the porous sheet is preferably a polyolefin or the like having no specific functional groups. Examples of the polyolefin include homopolymers or copolymers of olefins such as ethylene, propylene, 1-butene, 4-methyl-1-pentene, and 1-hexene, blends of these polymers, and the like. Preferred of these are polypropylene and polyethylene. Especially preferred is ultrahigh molecular polyethylene (hereinafter abbreviated as UHPE) having a weight average molecular weight of 1,000,000 or higher.

With respect to the form of the porous sheet, it may be a porous sheet consisting of particles bonded to one another or may be a nonwoven fabric consisting of fibers fusion-bonded to or interlaced with one another. The porous sheet is not particularly limited in pore diameter or porosity.

The coating of at least part of the surface of the sheet substrate with a polycarbodiimide compound of formula (I) may be accomplished by immersing the porous substrate in a solution of the polycarbodiimide, subsequently taking out the substrate, and drying it to vaporize the solvent. Alternatively, the coating may be accomplished by immersing the sheet substrate in a dispersion of particles or a powder of the polycarbodiimide or applying the dispersion to the separator to thereby infiltrate the polycarbodiimide into pores of the separator. Due to the incorporation of the particles or powder into the pores, the separator present between the electrodes has a substantially increased surface area and a reduced pore diameter, whereby the function of inhibiting self-discharge and liquid retentivity can be improved. The dispersion is more preferably one in which the dispersion medium is a polycarbodiimide solution. Upon drying, the solution forms a coating on the surface of the fibers or particles constituting the separator, whereby not only the surface area of polycarbodiimide is increased but also the particles or powder can be prevented from falling from the separator. If desired, the polycarbodiimide may be crosslinked.

In the case where the porous sheet is one consisting of a UHPE powder bonded to one another, this porous sheet usually preferably has a thickness of from 10 to 300 $\mu$m, a porosity of from 20 to 80%, and a pore diameter of from 1 to 500 $\mu$m. A preferred UHPE porous sheet for use in the invention can be produced, for example, in the following manner.

A UHPE powder is packed into a shape-retaining tool, and this shape-retaining tool is placed in a pressure vessel. After the air is discharged from the vessel, the powder is sintered in a water vapor atmosphere heated to a temperature not lower than the melting point of the UHPE and then cooled to thereby obtain a porous material in a block form. Thereafter, this porous material is cut into sheets of a given thickness to thereby produce the porous sheet.

Furthermore, the separator of the invention may be a porous sheet produced by aggregating polycarbodiimide-coated polymer particles obtained by forming a coating layer of a polycarbodiimide of formula (I) on the surface of core particles. If n in formula (I) exceeds 10,000, the polycarbodiimide is insoluble in solvents and the desired polycarbodiimide-coated polymer particles cannot be obtained. From the standpoint of obtaining evenly coated polymer particles, n is preferably from 5 to 100, more preferably from 10 to 50.

For forming the core particles to be used for the polycarbodiimide-coated particles, either a thermoplastic or a thermosetting resin can be used.

Examples of the thermoplastic resin include polyethylene, polypropylene, polyacrylonitrile, polystyrene, acrylonitrile/styrene copolymer resins, acrylonitrile/butadiene/styrene copolymer resins, poly(methyl methacrylate), vinyl chloride/ethylene/vinyl acetate copolymers, thermoplastic polyurethanes, polyamides, polyacetals, chlorinated polyethylene, polycarbonates, poly(vinyl alcohol), and the like.

Examples of the thermosetting resin include epoxy resins, diallyl phthalate resins, silicone resins, phenolic resins, unsaturated polyester resins, polyimide resins, polyurethane resins, melamine resins, urea resins, and the like.

Especially preferred are polyolefin resins and fluororesins because these resins have excellent resistance to alkaline electrolytic solutions. Examples of the polyolefins include homopolymers or copolymers of olefins such as ethylene, propylene, 1-butene, 4-methyl-1-pentene, and 1-hexene, blends of these polymers, and the like. Preferred are polypropylene and polyethylene. Especially preferred is ultrahigh-molecular polyethylene (hereinafter abbreviated as UHPE) having a weight average molecular weight of 1,000,000 or higher.

Polycarbodiimide-coated particles are produced in the following manner. First, when the polycarbodiimide is solid, it is diluted with a solution in which the polymer is soluble. In the case of a solution, it is diluted to a given concentration so as to be easily handled. The solvent to be used here is not particularly limited as long as the polycarbodiimide is soluble therein. Examples thereof include hydrocarbons such as toluene and xylene; halogenated hydrocarbons such as tetrachloroethylene, 1,2-dichloroethane, and chloroform; ketones such as acetone, methyl ethyl ketone, methyl isobutyl ketone, and cyclohexanone; cyclic ethers such as tetrahydrofuran and dioxane; and the like. These may be used alone or in combination of two or more thereof. Although the viscosity of the solution is suitably regulated so that the solution can be easily handled, the concentration of the polycarbodiimide is preferably from 3 to 20% by weight.

To the polycarbodiimide solution thus prepared are added core polymer particles in such an amount as to result in a core particle concentration of about from 20 to 50% by weight. The resultant mixture is stirred with a mixer to obtain a slurry. This slurry is stirred with heating at a temperature lower than the melting point of the core particles to conduct a solvent elimination treatment.

In the case where the resulting coated polymer particles are in an aggregated state, a treatment for reducing the aggregate is suitably conducted using a stirrer, pulverizer, etc.

The polycarbodiimide-coated polymer particles described above are packed, for example, into a cylindrical metal vessel, heated and sintered, subsequently cooled, and then taken out from the vessel to thereby obtain a porous molding. Furthermore, this molding is cut into a given thickness with a lathe to obtain a porous sheet. Alternatively, a porous sheet is obtained also by a method in which the coated polymer particles are compressed at ordinary temperature in a mold having a certain gap to obtain a sheet-form molding and this sheet is heated and sintered. With the latter method, production is relatively easy. The former method of cutting is preferred in that a porous sheet having a thickness of, for example, from 50 to 200 µm can be obtained and thickness setting is relatively easy. Although the porous sheet thus obtained can be used as it is as a battery separator, a stretching treatment may be further conducted so as to increase porosity.

(Production of Polycarbodiimide)

The polycarbodiimide for use in the separator in the invention is represented by formula (I) described above. In formula (I), examples of the organic group R include aromatic or aliphatic organic groups.

(i) Examples of the aromatic organic groups include substituents represented by

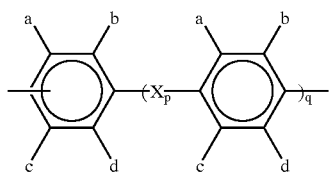

(wherein p is an integer of 0 to 10 and q means an integer of 0 to 5).

In the formula given above, X is

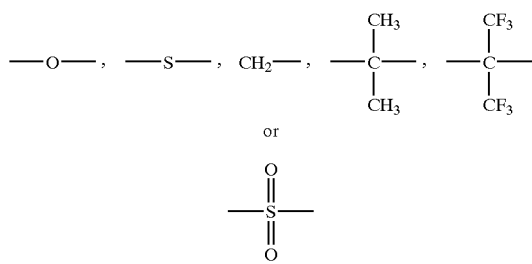

and the X's in the repeating units may be the same or different;

and a, b, c, and d are —H, —CH$_3$, —OCH$_3$, —CF$_3$, or —OCF$_3$ and may be the same or different.

(ii) Examples of the aliphatic organic groups include substituents represented by

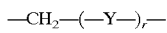

(wherein r means an integer of 0 to 10).

In the formula given above, Y is

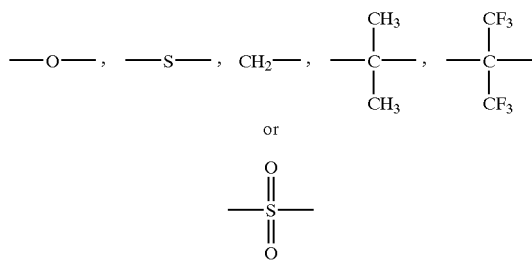

and the Y's in the repeating units may be the same or different; and a, b, c, and d are —H, —CH$_3$, —OCH$_3$, —CF$_3$, or —OCF$_3$ and may be the same or different.

In formula (I), n is 1 to 10,000. If n exceeds 10,000, the polycarbodiimide undesirably has a reduced gelation time at room temperature, resulting in impaired workability.

For obtaining such a polycarbodiimide, a known method can be used. For example, the polycarbodiimide can be easily obtained by reacting an organic diisocyanate in an organic solvent in the presence of a carbodiimide synthesis catalyst in the manner described in T. W. Campbell et al., *J. Org. Chem.*, 28, 2069(1963), L. M. Alberino et al., *J. Appl. Polym. Sci.*, 21, 1999(1977), Unexamined Published Japanese Patent Applications Nos. 2-292316 and 4-275359, etc.

As the organic diisocyanate for use in the polycarbodiimide synthesis can be used, for example, 2,4-tolylene diisocyanate, 2,6-tolylene diisocyanate, 1-methoxyphenyl 2,4-diisocyanate, 4,4'-diphenylmethane diisocyanate, 3,3'-dimethoxy-4,4'-diphenylmethane diisocyanate, 3,3'-dimethyl-4,4'-diphenylmethanediisocyanate, 4,4'-diphenyl ether diisocyanate, 3,3'-dimethyl-4,4'-diphenyl ether diisocyanate, hexamethylene diisocyanate, xylylene diisocyanate, 2,2-bis[4-(4-isocyanatophenoxy)phenyl] hexafluoropropane, 2,2-bis[4-(4-isocyanatophenoxy) methyl]propane, 2,2-dimethyl-1,3-bis(4-isocyanatophenoxy) propane, or the like. These may be used alone or may be used in combination of two or more thereof (to obtain a copolymer). For the purpose of imparting hydrophobicity, an organic diisocyanate substituted with one or more fluorine groups may be partly used.

As the organic solvent can be used, for example, toluene, xylene, a halogenated hydrocarbon such as tetrachloroethylene, 1,2-dichloroethane, or chloroform, a ketone such as acetone, methyl ethyl ketone, methyl isobutyl ketone, or cyclohexanone, a cyclic ether such as tetrahydrofuran or dioxane, or the like. These may be used alone or in combination of two or more thereof.

Furthermore, as the carbodiimide synthesis catalyst can be used, for example, a phospholene oxide such as 3-methyl-1-phenylphospholene 1-oxide, 1-phenyl-2-phospholene 1-oxide, 1-ethyl-2-phospholene 1-oxide, 1-ethyl-2-phospholene 1-oxide, or the 3-phospholene isomer of any of these. These may be used alone or in combination of two or more thereof.

In any of the final, middle, and initial stages of the polymerization reaction or throughout the reaction, a chain-terminating treatment may be conducted by adding a monoisocyanate. As such a monoisocyanate can be used phenyl isocyanate, p-nitrophenyl isocyanate, p- and m-tolyl isocyanates, p-formylphenyl isocyanate, p-isopropylphenyl isocyanate, or the like. The polycarbodiimide solution thus obtained has excellent storage stability.

The polycarbodiimide solution obtained is cast on a glass plate, dried, and peeled off, whereby a sheet can be obtained. On the other hand, particles or a powder can be obtained by vacuum-drying the solution described above and optionally pulverizing the resultant particles.

With respect to the function of inhibiting self-discharge, this function is presumed to be attributable to the ammonia gas trapping function of carbodiimide groups (W. Weith, Ber., 7, 10(1874)), because the fact that carbodiimide groups disappear when a sheet formed from carbodiimide is brought into contact with ammonia gas can be ascertained from an infrared absorption spectrum.

EXAMPLES

The invention will be explained below in more detail based on Examples and Comparative Examples. Cells were evaluated in the following manner.

(Evaluation of Cell)

A cell was examined for discharge capacity, and then fully charged. The cell charged was stored for 1 week in a 45° C. atmosphere to cause self-discharge and then examined for discharge capacity. This cell was fully recharged and then examined for discharge capacity. The results are shown in Table 1.

The discharge rate was regulated too 0.2 $C_5A$, and the capacity retention was determined using the following equation.

Capacity retention [%]=(discharge capacity after self-discharge [Ah])/((discharge capacity before self-discharge [Ah]+discharge capacity after full recharge after self-discharge [Ah])/2)×100.

Example I-1

To 500 g of toluene was added 100 g of Takenate 80 (manufactured by Takeda Chemical Industries, Ltd.; a 2,4-tolylene diisocyanate/2,6-tolylene diisocyanate mixture) together with 0.06 g of a carbodiimide synthesis catalyst (3-methyl-1-phenylphospholene 1-oxide) and 10 g of isopropylphenyl isocyanate. This mixture was reacted at 100° C. for 6 hours to obtain a polycarbodiimide solution (solution A). The molecular weight thereof was measured by GPC (gel permeation chromatography) to determine n, which was thus found to be 25. This solution was cooled to room temperature. Subsequently, a nonwoven fabric composed of polypropylene and polyethylene fibers (basis weight, 60 g/m$^2$) was immersed as a porous sheet in that solution, taken out therefrom, and then dried at 90° C. for 30 minutes to obtain a battery separator. The amount of the polymer deposited on the nonwoven fabric was 22 g/m$^2$.

On the other hand, 100 parts by weight of a nickel hydroxide powder was mixed with 10 parts by weight of a cobalt powder, 10 parts by weight of a polytetrafluoroethylene (PTFE) powder, and 20 parts by weight of water to prepare a dispersion for positive-electrode formation. This liquid was forced into a foamed nickel (Ni) plate. This plate was dried and then pressed into a sheet to obtain a positive electrode. Furthermore, 100 parts by weight of a hydrogen-occluding alloy (mischmetal type) was mixed with 10 parts by weight of a PTFE powder and 20 parts by weight of water to prepare a dispersion for negative-electrode formation, which was forced into a foamed nickel plate. This plate was dried and then pressed into a sheet to obtain a negative electrode.

In fabricating a button type nickel-hydrogen cell (2032 size: diameter, 20 mm; height, 3.2 mm), the separator described above was immersed beforehand in a 7.2 kmol/m$^3$ electrolytic solution of potassium hydroxide to conduct vacuum impregnation. As shown in FIG. 1, a nickel wire gauze 2 for current collection and a nickel collector 3 were placed in a cell inner case 1, and the negative electrode 4, the separator 5, the positive electrode 6, and an outer cover 8 were superposed thereon.

Example I-2

A polycarbodiimide solution (solution B) was obtained (n determined by GPC was 408) and a cell was produced in the same manner as in Example I-1, except that 4,4'-diphenylmethane diisocyanate was used in place of Takenate 80.

Example I-3

A polycarbodiimide solution (solution C) was obtained (n determined by GPC was 18) and a cell was produced in the same manner as in Example I-1, except that 2,2'-dimethyl-1,3-bis(4-isocyanatophenoxy)phenyl]propane was used in place of Takenate 80.

Example I-4

A polycarbodiimide solution (solution D) was obtained (n determined by GPC was 30) and a cell was produced in the same manner as in Example I-1, except that 2,2'-bis[4-(4-isocyanatophenoxy)phenyl]hexafluoropropane was used in place of Takenate 80.

Comparative Example I-1

The nonwoven fabric substrate used in Example I-1 was immersed in a 2.5 wt% aqueous solution of sodium dodecylbenzenesulfonate without being subjected to the polycarbodiimide-coating treatment. The substrate was then dried to obtain a battery separator. A cell was fabricated in the same manner as in Example I-1, except the separator.

The results given above show that the function of inhibiting self-discharge can be improved without reducing the substrate strength, by coating at least part of the separator surface with polycarbodiimide.

Example II-1

Two kilograms of a UHPE powder (weight-average molecular weight, 4,500,000; melting point, 135° C.; average particle diameter, 106 μm (sieved product)) was packed into a shape-retaining tool comprising a mold formed by placing a cylindrical metal gauze cage having an outer diameter of 4 cm in the center of a cylindrical metal gauze cage (inner diameter, 15 cm) and applying a porous polytetrafluoroethylene sheet to the inside of the resultant-doughnut space.

This mold was placed in a heat-resistant pressure vessel made of metal (equipped with a water vapor introduction pipe and a switch valve therefor), and the ambient pressure was adjusted to 1.3 kPa with a vacuum pump. Subsequently, the pump was stopped, and the pressure vessel was allowed to stand in this state for 30 minutes. Thereafter, the valve was opened to introduce water vapor and the ambient temperature was elevated to 120° C. over 10 minutes. This state was maintained for 30 minutes.

Thereafter, the water vapor pressure was increased to 0.4 MPa and the temperature was regulated to 145° C. By maintaining this state, the UHPE powder was heated and sintered for 3 hours. Subsequently, the valve was closed to allow the sinter to cool naturally. Thus, a cylindrical porous material was obtained. The porous material obtained was cut into a thickness of 200 μm with a cutting lathe to obtain a porous sheet having a porosity of 38%.

A polycarbodiimide solution (solution A) was obtained in the same manner as in Example I-1. The value of n was determined by GPC and was found to be 25. This solution was cooled to room temperature. Thereafter, the porous sheet described above was immersed therein, taken out therefrom, and then dried at 90° C. for 30 minutes to vaporize and remove the toluene. Thus, a battery separator (the amount of the polymer deposited thereon was 21 g/m$^2$) was obtained.

This separator was immersed beforehand in a 7.2 kmol/m$^3$ electrolytic solution of potassium hydroxide to conduct vacuum impregnation. A button type nickel-hydrogen cell of the 2032 size like the cells described above was fabricated. The cell components used other than the separator were the same as in Example I-1.

Example II-2

A polycarbodiimide solution was obtained in the same manner as in Example I-1, except that xylylene diisocyanate was used in place of Takenate 80. The value of n of the polycarbodiimide obtained was 300. Using this solution, a cell was fabricated in the same manner as in Example II-1.

Example II-3

A polycarbodiimide solution (solution B) was obtained (n determined by GPC was 408) and a cell was produced in the same manner as in Example II-1, except that 4,4'-diphenylmethane diisocyanate was used in place of Takenate 80.

Example II-4

A polycarbodiimide solution (solution C) was obtained (n determined by GPC was 18) and a cell was produced in the same manner as in Example II-1, except that 2,2'-dimethyl-1,3-bis(4-isocyanatophenoxy)phenyl]propane was used in place of Takenate 80.

Example II-5

A polycarbodiimide solution (solution D) was obtained (n determined by GPC was 30) and a cell was produced in the same manner as in Example II-1, except that 2,2'-bis[4-(4-isocyanatophenoxy)phenyl]hexafluoropropane was used in place of Takenate 80.

The results given above show that the function of inhibiting self-discharge can be improved by coating at least part of the separator surface with polycarbodiimide.

Example III-1

A polycarbodiimide solution (solution A) was obtained in the same manner as in Example I-1. The solution was cooled to room temperature and then vacuum-dried. The polymer dried was pulverized with a mortar. The resultant particles were sieved with a sieve having an opening size of 31 $\mu$m. Ten parts by weight of the polycarbodiimide powder which had passed the sieve was mixed with 10 parts by weight of the solution prepared above and 10 parts by weight of toluene to prepare a dispersion.

A nonwoven fabric composed of polypropylene and polyethylene fibers (basis weight, 60 g/m$^2$) was immersed as a separator in the dispersion described above and dried at 80° C. for 30 minutes to obtain a battery separator of the invention. The separator was immersed beforehand in a 7.2 kmol/m$^3$ electrolytic solution of potassium hydroxide to conduct vacuum impregnation and thereby incorporate the electrolytic solution into the pores. A button type nickel-hydrogen cell of the 2032 size was fabricated. The cell components used other than the separator were the same as in Example I-1.

Example III-2

A porous sheet (thickness, 200 $\mu$m; porosity, 38%) was obtained from a UHPE powder in the same manner as in Example II-1. A button type cell was fabricated in the same manner as in Example III-1, except that this separator was used and that the dispersion was one prepared by mixing 10 parts by weight of the polycarbodiimide powder with 10 parts by weight of toluene.

Examples III-3 and III-4

A polycarbodiimide solution (solution B) was obtained (n determined by GPC was 408) and cells were produced in the same manner as in Examples III-1 and III-2, respectively, except that 4,4'-diphenylmethane diisocyanate was used in place of Takenate 80.

Examples III-5 and III-6

A polycarbodiimide solution (solution C) was obtained (n determined by GPC was 18) and cells were produced in the same manner as in Examples III-1 and III-2, respectively, except that 2,2'-dimethyl-1,3-bis(4-isocyanatophenoxy)phenyl]-propane was used in place of Takenate 80.

Example III-7 and III-8

A polycarbodiimide solution (solution D) was obtained (n determined by GPC was 30) and cells were produced in the same manner as in Examples III-1 and III-2, respectively, except that 2,2'-bis[4-(4-isocyanatophenoxy)phenyl] hexafluoro-propane was used in place of Takenate 80.

Comparative Example III-1

A cell was fabricated without subjecting the separator substrate used in Example III-2 to coating with polycarbodiimide.

The results show that the function of inhibiting self-discharge can be improved by causing a particulate or powdery polycarbodiimide to be retained in pores of the separator.

Example IV-1

A polycarbodiimide solution (solution A) was obtained in the same manner as in Example I-1. The value of n of the resultant polycarbodiimide determined by GPC was 31. The solution obtained was stirred together with 1.8 kg of a UHPE powder (weight-average molecular weight, 4,500,000; melting point, 135° C.; average particle diameter, 106 $\mu$m (sieved product)) with a mixer for 30 minutes. Thereafter, the mixture was dried in a hot-air drying oven (100° C.) for 3 hours. The particle aggregates obtained were pulverized with a small pulverizer to obtain polycarbodiimide-coated polymer particles having carbodiimide groups on the surface thereof.

Subsequently, the particles were packed into a mold having a gap, compressed at 25° C. and a pressure of 20 MPa, and then sintered at 145° C. for 2 hours in a hot-air drying oven. After the sintering, the mold was taken out from the oven and cooled. Thus, a sintered porous sheet (thickness, 300 $\mu$m; porosity, 25%) was obtained.

Example IV-2

A shape-retaining tool was prepared which comprised a mold formed by placing a cylindrical metal gauze cage having an outer diameter of 4 cm in the center of a cylindrical metal gauze cage (inner diameter, 15 cm) and applying a porous polytetrafluoroethylene sheet to the inside of the resultant doughnut space. The polycarbodiimide-coated polymer particles used in Example IV-1 were packed into this shape-retaining tool. This mold was placed in a heat-resistant pressure vessel made of metal (equipped with a water vapor introduction pipe and a switch valve therefor), and the ambient pressure was adjusted to 1.3 kPa with a vacuum pump. Subsequently, the pump was stopped, and the pressure vessel was allowed to stand in this state for 30 minutes. Thereafter, the valve was opened to introduce water vapor and the ambient temperature was elevated to 120° C. over 10 minutes. This state was maintained for 30 minutes. Thereafter, the water vapor pressure was increased to 0.4 MPa and the temperature was regulated to 145° C. By maintaining this state, the coated polymer particles were heated and sintered for 3 hours. Subsequently, the valve was closed to allow the sinter to cool naturally. Thus, a cylindrical porous material was obtained. The porous material obtained was cut into a thickness of 200 $\mu$m with a cutting lathe to obtain a porous sheet having a porosity of 50%.

Comparative Example IV-1

A porous sheet (thickness, 200 μm; porosity, 43%) was obtained in the same manner as in Example IV-2, except that a UHPE powder was used in place of the polycarbodiimide-coated polymer particles.

Example IV-3

A polycarbodiimide solution was obtained under the same conditions as in Example IV-1, except that 20 g of isopropylphenyl isocyanate was used. The value of n of the resultant polycarbodiimide determined by GPC was 15. The subsequent procedure was conducted in the same manner as in Example IV-2 to obtain a porous sheet having a thickness of 200 μm and a porosity of 52%.

Example IV-4

A polycarbodiimide solution was obtained under the same conditions as in Example IV-1, except that 0.5 g of isopropylphenyl isocyanate was used. The value of n of the resultant polycarbodiimide determined by GPC was 77. The subsequent procedure was conducted in the same manner as in Example IV-2 to obtain a porous sheet having a thickness of 200 μm and a porosity of 50%.

Example IV-5

Polycarbodiimide-coated polymer particles having carbodiimide groups on the surface thereof were obtained in the same manner as in Example IV-1, except that an aliphatic-polycarbodiimide solution (trade name, GX-V07; manufactured by Nisshinbo Industries, Inc.) was used. Thereafter, a porous sheet having a thickness of 200 μm and a porosity of 51% was obtained in the same manner as in Example IV-2.

(Fabrication of Cells)

The porous sheets obtained in Examples IV-1 to IV-5 and Comparative Example IV-1 were used as separators to fabricate cells. First, the separators were immersed beforehand in an electrolytic solution to conduct vacuum impregnation and thereby incorporate the electrolytic solution into the pores. Six button type nickel-hydrogen cells of the 2032 size (positive-electrode active material, nickel hydroxide; negative-electrode active material, hydrogen-occluding alloy; electrolytic solution, aqueous potassium hydroxide solution) were fabricated.

The results given above show that when porous sheets formed from polycarbodiimide-coated polymer particles having polycarbodiimide structural units are used as battery separators, then the self-discharge of the cells is considerably inhibited.

TABLE 1

| | | I Separator | | II Separator UHPE | III Separator | | IV Separator Coated particles |
|---|---|---|---|---|---|---|---|
| | | Polycarbodiimide | Nonwoven fabric | | Nonwoven fabric | UHPE | |
| Example | A | 82 | 82 | 82 | (III-1) 83 | (III-2) 82 | 82 |
| | | | | 78 | | | |
| | B | 83 | 83 | | (III-3) 83 | (III-4) 83 | — |
| | C | 81 | 80 | | (III-5) 79 | (III-6) 80 | — |
| | D | 73 | 75 | | (III-7) 76 | (III-8) 75 | — |
| | | | | | | | 78 |
| | | | | | | | 84 |
| | | | | | | | 82 |
| | | | | | | | 72 |
| Comparative Example | | 56 | — | — | | 56 | 44 |

INDUSTRIAL APPLICABILITY

According to the separator of the invention formed from polycarbodiimide-coated particles, the self-discharge of batteries can be inhibited. The battery of the invention is inhibited from suffering self-discharge.

What is claimed is:

1. A battery separator obtained by applying a polymer having in the molecule a carbodiimide unit represented by the following formula (I):

$$-[-R-N=C=N-]_n- \quad (I)$$

(wherein R is an organic group and n is an integer of 1 to 10,000) to a porous sheet substrate, which comprises a porous sheet substrate produced by aggregating polycarbodiimide-coated polymer particles obtained by forming a coating layer of the polymer of formula (I) on the surface of core particles.

2. The battery separator of claim 1, wherein the core particles are a polyolefin.

* * * * *